US006427947B1

(12) United States Patent
Rohrlick et al.

(10) Patent No.: US 6,427,947 B1
(45) Date of Patent: Aug. 6, 2002

(54) INTERFACE PALLET SYSTEM

(75) Inventors: Myles A. Rohrlick, Oceanside; Anibal J. Garcia, Chino; Richard Joseph Almassy, Cypress; James Sterling Wells, Fountain Valley, all of CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/656,486

(22) Filed: Sep. 7, 2000

(51) Int. Cl.$^7$ ................................................ B64D 9/00
(52) U.S. Cl. ................................ 244/137.1; 244/118.1; 410/77
(58) Field of Search ........................... 244/118.1, 118.2, 244/137.1, 137.3; 410/95, 92, 67, 77, 81, 89, 35, 46, 82; 193/35 R; 414/532

(56) References Cited

U.S. PATENT DOCUMENTS

| | | | |
|---|---|---|---|
| 3,724,788 A | * 4/1973 | Petry et al. | .............. 244/137 R |
| 3,741,504 A | * 6/1973 | Alberti et al. | .......... 244/137 R |
| 4,049,135 A | 9/1977 | Glassmeyer | |
| 4,108,326 A | 8/1978 | Bertolini | |
| 4,629,379 A | 12/1986 | Harris et al. | |
| 4,915,567 A | 4/1990 | Elligsen | |
| 5,865,579 A | 2/1999 | Thomas | |

* cited by examiner

Primary Examiner—Thomas Price
Assistant Examiner—Timothy D. Collins
(74) Attorney, Agent, or Firm—Harness Dickey & Pierce P.L.C.

(57) ABSTRACT

A pallet interface system for supporting a Container Roll in/Out Platform (CROP), flatrack or ISO container within an aircraft, such as a C-17 aircraft. The interface system includes two independent, identical interface pallets which are coupled together by flexible cables. The cables have lengths which enable the two interface pallets to be spaced apart a precise distance so as to be able to support a CROP, flatrack or ISO container. The interface pallets are of small enough dimensions and weight such that same can be manipulated by one or more individuals, thereby obviating the need for a crane to be employed to lift the load onto the pallets before the loading process can begin. Each pallet has a plurality of ISO locking assemblies which allow a CROP, flatrack or ISO container to be locked thereto. Each pallet also has a 463L cargo system edge structure which permits it to be locked to the rails within the C-17 aircraft. The pallet interface system also enables combat offloads and permits cargo supporting platforms to be transported to small, austere airfields where cranes and other large material handling equipment are not available. The pallet interface system can also accommodate different lengths of flatracks, ISO containers, etc., with only minor modifications to the lengths of the cables being required, and is adaptable to handle cargo supporting platforms having varying widths.

13 Claims, 4 Drawing Sheets

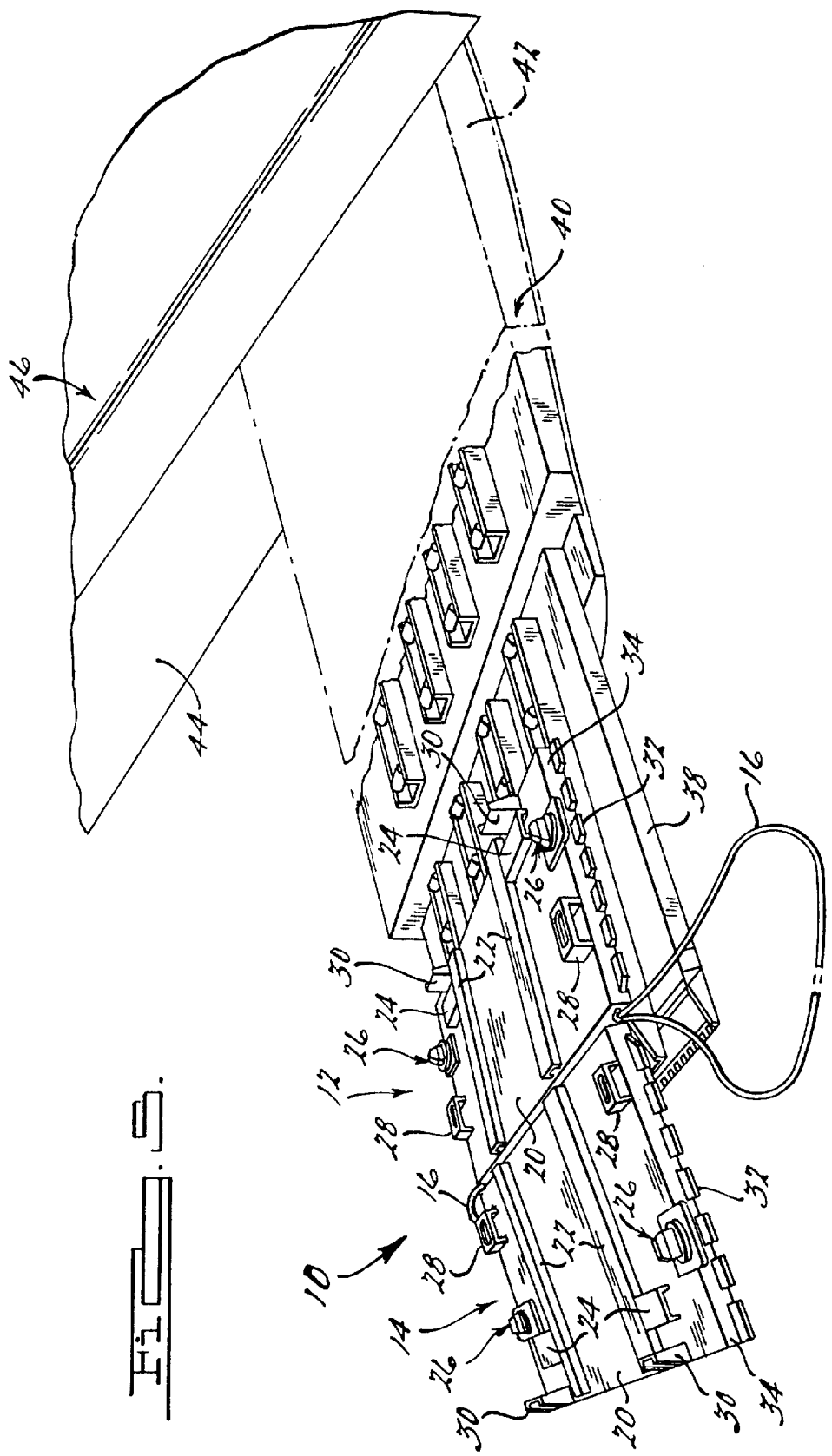

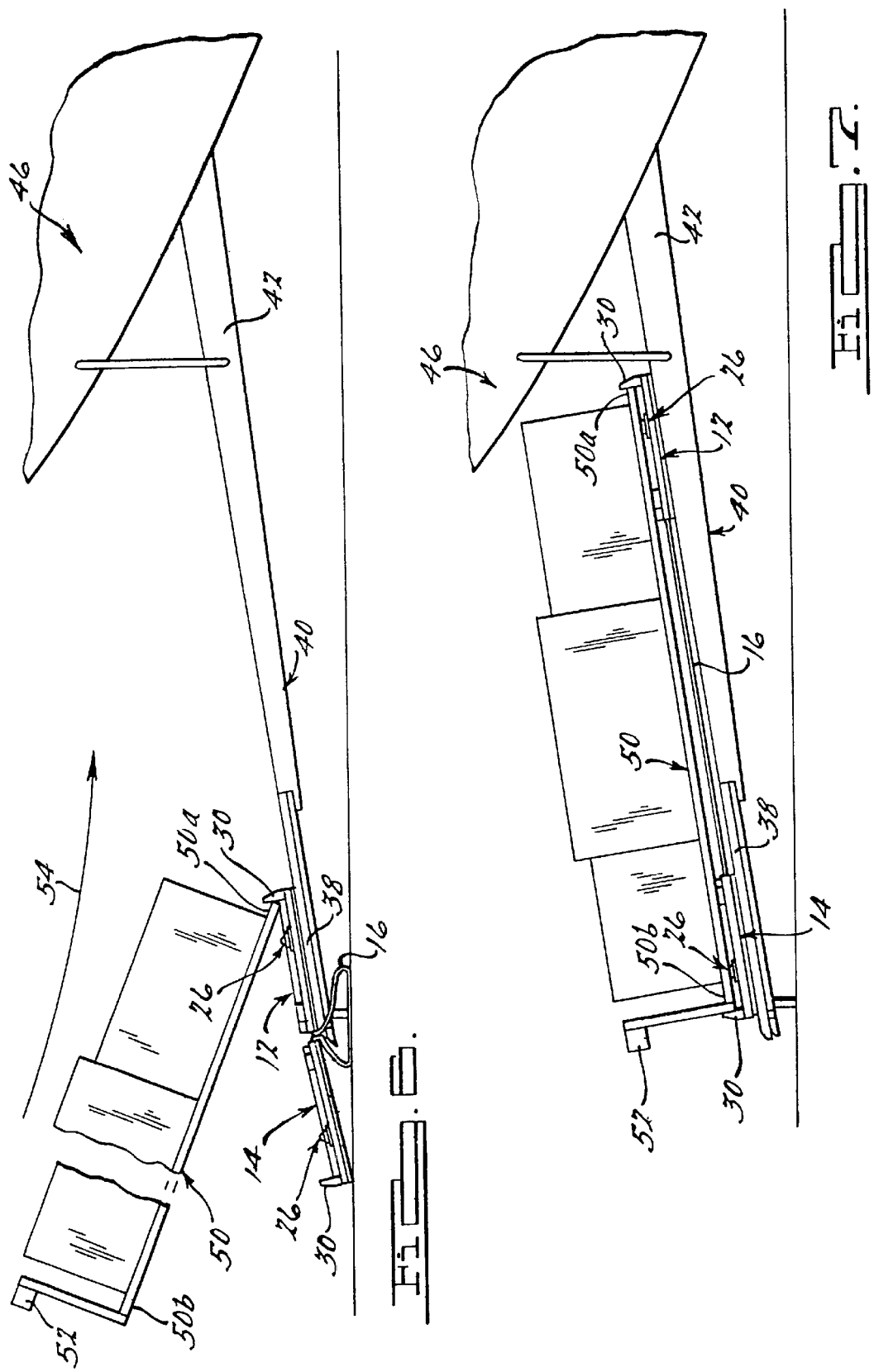

INTERFACE PALLET SYSTEM

TECHNICAL FIELD

This invention relates to interface pallets, and more particularly to an interface pallet system incorporating independent first and second interface pallets linked together by a flexible cable which allow large cargo supporting platforms to be more quickly and easily loaded and transported on cargo aircraft.

BACKGROUND OF THE INVENTION

Present day military transport aircraft, such as the C-17, are used to transport flatracks, "Container Roll in/Out Platforms" (CROPs), and ISO container loads. However, these structures cannot be loaded directly onto the loading ramp of a C-17 aircraft. Instead, three standard 463L pallets are required for supporting the CROP, flatrack or ISO container thereon. The three standard 463L pallets must first be secured together in a "married" configuration. Next, a large crane is required to lift the CROP, flatrack or ISO container onto the married pallet system. The load must then be secured to the pallet system with restraint straps or chains. Finally, material handling equipment such as a K-loader must be used to transport the entire assembly and load it onto the loading ramp of the aircraft and into the fuselage thereof. This procedure is necessary because the CROP, flatrack or ISO container cannot be rolled directly on the roller assemblies of the loading ramp because of the complexly shaped lower surfaces of these cargo supporting platforms or containers. Thus, the use of the married pallet has heretofore been necessary.

The foregoing procedure thus requires a crane and a K-loader to be present at the site where the aircraft is to be loaded and also at the location where the aircraft is to be unloaded. It also prevents what is termed a "combat off-load" wherein the load would be allowed to be simply rolled off the loading ramp as the aircraft is moving along a runway or parking ramp immediately after landing. Since combat offloads are therefore prohibited when employing a married pallet system, the delivery of a CROP, flatrack or ISO container is limited to only those locations where a large crane and K-loader are available. This eliminates the possibility of off-loading cargo at generally small, austere airfields where such equipment is not available.

Often, material handling equipment such as a crane and a K-loader must be flown ahead of time on a separate aircraft to the location where the aircraft carrying the CROP, flatrack or ISO container and its associated cargo is to be off-loaded. On occasion, as many as three flights may be needed to deliver one CROP, flatrack or ISO container to an austere airfield (i.e., one to transport a K-loader, one to transport a crane and one to transport the CROP, flatrack or ISO container).

It is therefore a principal object of the present invention to provide a pallet interface system which eliminates the need for a married pallet system to be used in the process of loading and supporting a CROP, flatrack or ISO container being transported on a cargo aircraft.

It is a further object of the present invention to provide an interface pallet system which can be positioned on the roller assemblies of a loading ramp of a cargo aircraft, such as a C-17 aircraft, and which permits a CROP, flatrack or ISO container to be positioned directly on the interface pallet system such that the entire assembly can be loaded onto or unloaded from the aircraft without the need for a large crane, and which also permits combat offloads to be performed.

It is also an object of the present invention to provide a pallet interface system which is capable of being used to support cargo supporting platforms thereon having varying lengths, without requiring modification to the pallet interface system.

It is still another object of the present invention to provide a pallet interface system comprised of first and second interface pallets which are sufficiently small and lightweight so as to be movable by one or more individuals without the aid of material handling equipment such as a crane.

SUMMARY OF THE INVENTION

The above and other objects are provided by a pallet interface system in accordance with preferred embodiments of the present invention. The pallet interface system includes a first interface pallet and a second interface pallet which are coupled to together by at least one, and preferably a pair, of flexible cables having predetermined lengths. Each interface pallet is used to support a portion of a CROP, flatrack or ISO container. The lengths of the cables allow the two interface pallets to be spaced apart a precise distance to thereby tailor the system to the dimensions of the specific cargo supporting platform (i.e., CROP, flatrack or ISO container) being carried by the interface pallets.

It is a principal advantage of the present invention that since a pair of interface pallets are incorporated, the smaller dimensions of each pallet enable both to be handled by one or more individuals without the aid of large material handling equipment such as a crane. This allows the interface pallet system of the present invention to be used in environments such as small, austere airfields where it would be difficult, if not impossible, to transport and employ material handling equipment for the purpose of unloading CROPs, flatracks or ISO containers from a cargo transport aircraft.

Each interface pallet preferably includes an upstanding stop portion which is adapted to abut a leading edge of a CROP, flatrack or ISO container when same is loaded onto the pallet system. Each interface pallet further includes an ISO locking assembly for enabling the cargo supporting platform being supported thereon to be locked to the interface pallets. Each interface pallet further preferably includes edge structure which allows each interface pallet to be locked to a rail system used on the transport aircraft.

In operation a first one of the interface pallets is placed on the roller assemblies of the loading ramp of an aircraft, such as a C-17 aircraft, while the second one of the interface pallets is positioned such that a fore end thereof is placed on an edge of the loading ramp while its aft end is rested on a ground surface. The first and second interface pallets are thus positioned adjacent one another in abutting relationship.

A PLS (palletized loading system) truck or other suitable equipment is then used to lower the fore edge of a CROP, flatrack or ISO container onto the fore edge of the first interface pallet, and then pushes the cargo supporting platform forwardly up the loading ramp, which causes the first interface pallet to be rolled concurrently up the ramp. When the cables coupling the two interface pallets reach their folly extended positions they will begin to drag the second interface pallet onto and up the ramp concurrently with the first interface pallet. Then the aft end of the cargo supporting platform is automatically lowered onto the second interface pallet. After the aircraft cargo ramp is positioned to the horizontal position, the entire assembly of cargo supporting platform and the two interface pallets can then be rolled into the fuselage of the aircraft using the integrated aircraft cargo handling roller assemblies. The cargo supporting platforms, once positioned on the interface pallets, can also be loaded directly from a K-loader to the aircraft or directly from the aircraft to the K-loader, if desired. Still further, the cargo supporting platform can be loaded onto and off-loaded from a K-loader directly onto a PLS truck.

Since a large crane is not required for the loading of the cargo supporting platform onto the interface pallets, combat offloads can also be accomplished at small, austere airfields where such offloads would not be possible with a conventional married pallet system. The apparatus and method of the present invention thus allows cargo to be delivered to locations where cranes, K-loaders and other large material handling equipment cannot be delivered, as well as significantly simplifying the loading of such cargo supporting platforms within present day transport cargo aircraft employing loading ramps having a plurality of roller assemblies.

BRIEF DESCRIPTION OF THE DRAWINGS

The various advantages of the present invention will become apparent to one skilled in the art by reading the following specification and subjoined claims and by referencing the following drawings in which:

FIG. 5 is a perspective view of the interface pallets positioned on a toe of a loading ramp of a cargo aircraft prior to the cargo supporting platform being positioned on the interface pallets; and FIG. 6 is a side view of a cargo supporting platform with its fore edge positioned against the upstanding stop portions at the fore edge of the first pallet, ready to be urged up the loading ramp by a K-loader; and FIG. 7 is a side view of the first and second interface pallets extended in a fully spaced apart position with the cargo supporting platform disposed thereon and in the process of being urged up the loading ramp of the aircraft.

DETAILED DESCRIPTION OF THE PREFERRED EMBODIMENTS

Figure 1:
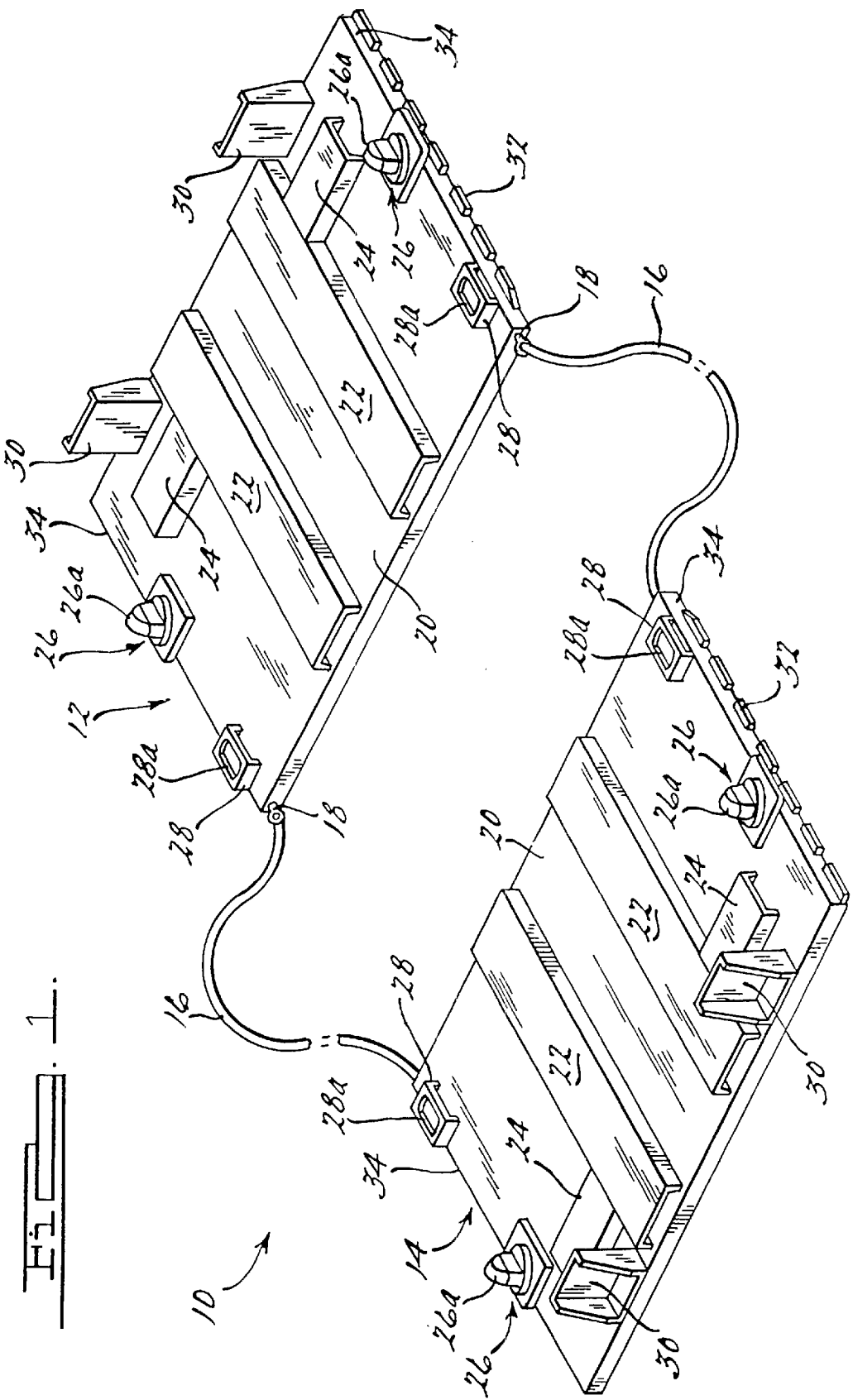
FIG. 1 is a perspective view of an interface pallet system in accordance with a preferred embodiment of the present invention.

Referring to FIG. 1, there is shown an interface pallet system 10 in accordance with a preferred embodiment of the present invention. The system 10 comprises a first interface pallet 12 and a second interface pallet 14 which are preferably identical to one another. The two pallets 12 and 14 are coupled to one another by a plurality of flexible cables 16. Cables 16 each preferably comprise steel cables or other forms of suitably strong cables which are anchored at opposite ends to anchor structures 18 of each pallet 12 and 14. Alternatively, the cables 16 could each be contained on a spring biased spool, and therefore retracted on the spool when the pallets 12, 14 are positioned in abutting relationship.

Each of the pallets 12 and 14 may vary widely in dimensions, but in one preferred form each pallet 12, 14 is approximately 88 inches (2.24 m) in width and approximately 60 inches (1.5 m) in length. Each of the pallets 12, 14 are further preferably formed from aluminum and are therefore sufficiently light to enable each to be lifted and transported by one or more individuals or by small cargo handling equipment.

Figure 2:
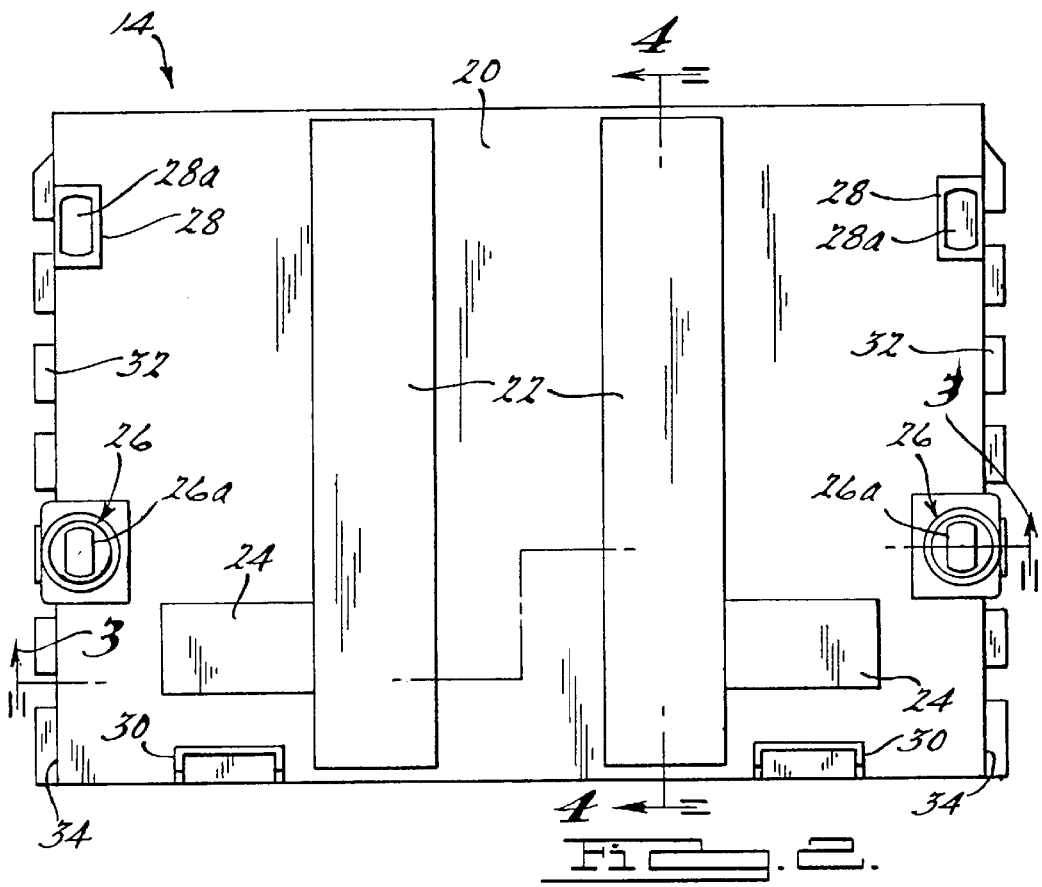
FIG. 2 is a plan view of one of the interface pallets shown in FIG. 1.

Since the pallets 12 and 14 are preferably identical, the specific construction of each will be explained with reference to pallet 14. Referring to FIG. 2, pallet 14 includes an upper surface 20 formed in part by a pair of parallel spaced, tubular support members 22. Adjacent each support member 22 is a roller stop member 24. A pair of well known, male ISO locking assemblies 26 are included for allowing the pallet 14 to be secured to complimentary ISO locking structure incorporated on a "Container Roll in/Out Platform" (CROP), flatrack or ISO container, which will be referred to generically herein as a cargo supporting platform. Standard, female ISO locking structures 28 are also included for allowing the pallets 12 and 14 to be stacked one on top of each other and secured to each other by placing the male locking assemblies 26 of one pallet within the openings 28a of the other ISO locking structures 28. In this regard it will be appreciated that each male ISO locking assembly 26 includes a rotatable locking element 26a which is adapted to fit within an associated opening 28a and which can be turned after being placed in the opening 28a. The two interface pallets 12 and 14 can then be transported and stored more conveniently as a single unit. The male ISO locking assemblies 26 could also be mounted on sliding or pivoting members, or could be mountable at different positions on their respective pallet, to enable them to be used to secure CROPs or PLS flatracks which have their female ISO locking structures disposed at different widths.

The interface pallet 14 further includes a pair of spaced apart, upstanding stop members 30 which assist in accomplishing loading of the cargo supporting platform thereon. The pallet 14 also includes a 463L cargo system compatible edge structure 32 on opposite side edges 34 thereof which allow the pallet 14 to be locked in place by a rail system used on transport aircraft, such as the C-17 aircraft manufactured by The Boeing Company.

Figure 3:
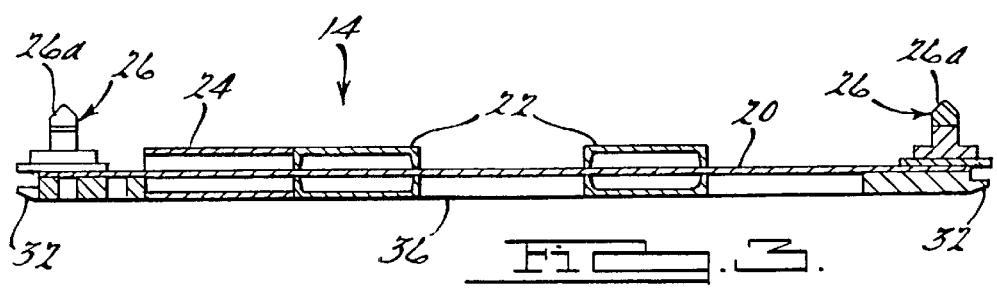
FIG. 3 is a cross sectional end view in accordance with section line 3—3 in FIG. 2 of the interface pallet shown in FIG. 2.
Figure 4:
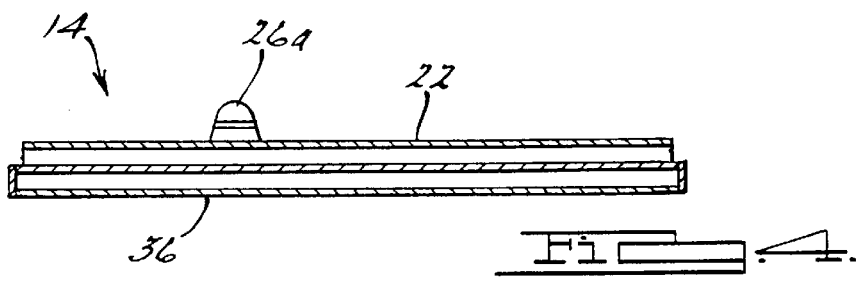
FIG. 4 is an end view of the interface pallet of FIG. 2 taken in accordance with section line 4—4 in FIG. 2.

With brief reference to FIGS. 3 and 4, it will be appreciated that the pallets 12 and 14 each have a smooth bottom surface 36 which is able to roll freely over the roller assemblies used on a loading ramp of a transport aircraft. The support members 22 provide raised surfaces that engage with the lower surface of the cargo supporting platform to more evenly distribute the weight of the platform over the pallet 14.

Referring to FIG. 5, the use of the pallet interface system will now be described. Initially, pallet 12 is placed on the loading toes 38 of loading ramp 40 of a cargo aircraft 46. The loading ramp 40 also includes an upper portion 42 from which the toe 38 depends. The toe 38 and upper portion 42 each include a plurality of rollers disposed along a plurality of parallel spaced tracks for permitting the pallets 12 and 14 to be rolled up the loading ramp 40 and into a fuselage 44 of the aircraft 46. It will also be appreciated that while reference may be made to a C-17 cargo aircraft, that the interface pallet system 10 of the present invention is not limited to use with only this type of aircraft, but could just as easily be used with a variety of cargo aircrafts employing a loading ramp having a plurality of roller assemblies over which the system 10 can be rolled.

Referring to FIG. 6, a fore edge (i.e., leading edge) 50a of a cargo supporting platform 50 is placed against the stop members 30 of pallet 12 by a support arm 52 of a PLS truck and then pushed upwardly in accordance with directional arrow 54. This causes the platform 54 to push the first pallet 12 upwardly over the toe 38 and onto the upper portion 42 of the loading ramp 40. When the cables 16 are stretched out, further movement of the first pallet 12 up the loading ramp 40 causes the second pallet 14 to be pulled behind it at a precise, predetermined distance from the first pallet 12. As the cargo supporting platform 50 is moved forwardly up the loading ramp 40 by the PLS truck unbading actions, both pallets 12 and 14 are urged up the loading ramp 40. The aft end 50*b* of the platform 50 is gradually lowered down onto the second pallet 14, as indicated in FIG. 7. The fore end 50*a* of the platform 50 will be similarly aligned with the male ISO locking assemblies 26 of the first pallet 12 so that the fore end 50*a* can be locked to the male ISO locking assemblies 26 of pallet 12. The aft end 50*b* is aligned with the pallet 14 such that its female ISO locking structure (not shown) engages with the male ISO locking assemblies 26. The cargo supporting platform 50 and pallets 12, 14 are secured into position on the aircraft ramp 40. Then the ramp 40 is moved to the horizontal; position so that the entire assembly (i.e., platform 50 and pallets 12, 14) can be rolled to a desired location inside the aircraft 46. Locking structure associated with the rails over which the pallets 12 and 14 are moved is then used to engage the 463L edge structure 32 on both sides of each pallet 12 and 14 to thus lock the pallets 12 and 14 securely within the fuselage 44.

It will be appreciated that a principal advantage of the present invention is that no crane is required to first place the platform 50 on a married pallet system and a K-loader used to place the entire assembly on the loading ramp of the aircraft. This also allows cargo to be off loaded at airfields where a large crane is not available for removing the cargo supporting platform from its pallet system.

Another important advantage of the present invention is that it allows combat offloads of CROPS, flatracks or ISO containers to be achieved, which would not be possible with the large, single interface pallet of a married pallet configuration. This is because the pallet interface system 10, by using two spaced apart smaller interface pallets 12 and 14 rather than a single, inter-coupled plurality of pallets, permits the fore end 50*a* of the platform 50 to be smoothly rolled off the loading ramp 42 after the back interface pallet 14 has settled on the ground, as the aircraft 46 continues moving forward. With the large, single interface pallet or a married pallet configuration, once the aft end reaches the ground surface, continued forward movement of the loading ramp would cause an unacceptable degree. of bouncing and point pressure on the aircraft roller assemblies as the leading edge of this pallet system rolls off of each roller assembly as the aircraft continues to move forward. Because the present invention provides for the platform to remain co-planar with the aircraft roller assemblies, the cargo supporting platform is more smoothly and evenly rolled down the loading ramp and its toe portion without damaging the roller assemblies thereon.

Still another advantage of the pallet interface system 10 of the present invention is that the pallets 12 and 14, each being approximately 88 inches (2.24 m) wide, are able to fit side by side width-wise along the four side by side roller tracks of a C-17 aircraft. This enables 16 interface pallets 12, 14 to be used to support 8 CROPS, flatracks or ISO containers within the C-17 aircraft.

Yet another advantage of the pallet interface system 10 is that it can be easily modified by changing the lengths of the cables 16 to accommodate cargo supporting platforms or ISO containers having differing lengths. By changing the width-wise positions of the male ISO locking assemblies 26, platforms or ISO containers having different widths can be easily accommodated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An interface pallet system for loading and supporting of cargo onto a cargo loading ramp of an aircraft, said system comprising:

a cargo supporting platform;

a first interface pallet for supporting a first longitudinal end portion of said cargo supporting platform;

a second interface pallet for supporting a second longitudinal end portion of said cargo supporting platform spaced apart from said first longitudinal end portion;

a flexible system coupling said pallets together, said flexible system having a length, when fully extended, which spaces apart said first and second interface pallets to cooperatively support said first and second longitudinal end portions of said cargo supporting platform; and whereby said interface pallets are capable of being slid along a plurality of rollers of said cargo ramp at a predetermined distance from one another to thereby permit said cargo supporting platform disposed thereon to be readily loaded onto and offloaded from said cargo ramp, and completely supported by said first and second interface pallets.

2. The system of claim 1, wherein each of said pallets includes a locking assembly for locking with cooperating portions of said cargo supporting platform to thereby secure said cargo supporting platform to said pallets.

3. The system of claim 1, wherein said flexible system comprises a pair of cables.

4. The system of claim 1, wherein at least one of said pallets includes at least one upstanding stop portion for engaging with a leading edge of said cargo supporting platform, to thereby permit said platform to move said at least one pallet along said cargo ramp during loading of said platform onto said cargo ramp.

5. The system of claim 2, wherein said locking assembly includes an ISO compatible locking system.

6. An interface pallet system for loading and supporting of cargo onto a cargo loading ramp of an aircraft, said system comprising:

a cargo supporting platform;

a first interface pallet for supporting a first longitudinal end portion of said cargo supporting platform;

a second interface pallet for supporting a second longitudinal end portion of said cargo supporting platform spaced apart from said first longitudinal end portion;

a coupling system including at least one flexible cable coupling said interface pallets to each other and spacing apart said pallets a maximum predetermined distance as said cargo supporting platform is loaded onto said pallets, to thereby support said cargo supporting platform at only said first and second longitudinal end portions thereof;

whereby said interface pallets are slid along a plurality of rollers of said cargo ramp to thereby permit said cargo supporting platform disposed thereon to be readily loaded and offloaded from said cargo ramp.

7. The system of claim 6, wherein said flexible coupling system comprises a pair of flexible cables.

8. The system of claim 6, wherein each said pallet further comprises an ISO compatible locking assembly for enabling each said pallet to be secured to cooperating ISO locking structures on said cargo supporting platform.

9. The system of claim 6, wherein each said pallet comprises a pair of male ISO compatible locking assemblies and a pair of female ISO compatible locking assemblies.

10. The system of claim 6, wherein each said pallet includes a 463L compatible edge for enabling it to be secured to a compatible rail system within said aircraft.

11. The system of claim 6, wherein each said interface pallet includes an upper surface having a pair of parallel disposed reinforcing support members for assisting in distributing the weight of said cargo supporting platform over said upper surface.

12. A method of loading and supporting a cargo supporting platform on a loading ramp of an aircraft, wherein the loading ramp includes a plurality of roller assemblies, the method comprising the steps of:

disposing a first interface pallet such that an entire area thereof is supported on said roller assemblies of said loading ramp;

disposing a second interface pallet such that only a fore end thereof is supported on said roller assemblies and an aft end thereof is supported on a ground surface adjacent said loading ramp, and such that an aft end of said first interface pallet abuts said fore end of said second interface pallet;

securing said aft end of said first interface pallet to said fore end of said second interface pallet with at least one flexible cable;

using a loading apparatus to position said cargo supporting platform such that a fore edge of said platform is disposed against an upstanding stop portion at said fore end of said first interface pallet;

using said loading apparatus to urge said cargo supporting platform forwardly onto said loading ramp, thereby urging said first interface pallet forwardly up said loading ramp, and wherein said flexible cable causes said first interface pallet to begin pulling said second interface pallet upwardly along said loading ramp once said cable is fully extended; and wherein said aft end of said cargo supporting platform can thereafter be lowered onto said second interface pallet, whereafter said pallets can be moved concurrently to effectively form a single supporting system to allow said cargo supporting platform to be urged into a fuselage of said aircraft.

13. A method of loading and supporting a cargo supporting platform on a loading ramp of a mobile platform, wherein the loading ramp includes a plurality of roller assemblies, the method comprising:

using a cargo supporting platform to support cargo thereon;

disposing a first interface pallet on at least a portion of said loading ramp;

disposing a second interface pallet adjacent said first interface pallet and partially on said loading ramp;

coupling said interface pallets together by at least one flexible cable, said cable having a length which allows said interface pallets to be spaced apart from one another a predetermined distance which is sufficient to allow said interface pallets to support opposite longitudinal ends of said cargo supporting platform, and to thereby form a supporting structure having an overall length generally in accordance with a longitudinal length of said cargo supporting platform;

placing a first longitudinal end of said cargo supporting platform on said first interface platform;

urging said cargo supporting platform upwardly along said loading ramp onto said mobile platform;

lowering a second longitudinal end of said cargo supporting platform onto said second interface pallet when said flexible cable is fully extended to its maximum length; and continuing to urge said cargo supporting platform upwardly along said cargo ramp until said interface pallets and said cargo supporing platform positioned thereon are completely supported on said mobile platform.

* * * * *